(12) United States Patent
Koguchi et al.

(10) Patent No.: US 7,900,095 B2
(45) Date of Patent: Mar. 1, 2011

(54) MEMORY CONTROLLER FOR WRITING DATA INTO AND READING DATA FROM A MEMORY

(75) Inventors: Takashi Koguchi, Kawasaki (JP); Kenji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 12/117,985

(22) Filed: May 9, 2008

(65) Prior Publication Data

US 2008/0288809 A1    Nov. 20, 2008

(30) Foreign Application Priority Data

May 15, 2007    (JP) .................................. 2007-129510

(51) Int. Cl.
  *G06F 11/00*    (2006.01)
(52) U.S. Cl. ................................ 714/54; 714/42; 714/52
(58) Field of Classification Search .................... 714/42, 714/52, 54
See application file for complete search history.

(56) References Cited

U.S. PATENT DOCUMENTS

| | | | | |
|---|---|---|---|---|
| 4,479,214 A | * | 10/1984 | Ryan | 714/702 |
| 6,934,936 B2 | * | 8/2005 | Clegg et al. | 717/127 |
| 7,124,329 B2 | * | 10/2006 | Ackaret et al. | 714/42 |
| 7,197,670 B2 | * | 3/2007 | Boatright et al. | 714/42 |
| 7,725,667 B2 | * | 5/2010 | Rowan et al. | 711/162 |
| 2009/0240990 A1 | * | 9/2009 | Gollub et al. | 714/45 |
| 2010/0138702 A1 | * | 6/2010 | Mamata | 714/54 |

FOREIGN PATENT DOCUMENTS

| | | |
|---|---|---|
| JP | 06-124218 A | 5/1994 |
| JP | 2000-011687 A | 1/2000 |

* cited by examiner

*Primary Examiner* — Philip Guyton
(74) *Attorney, Agent, or Firm* — Westerman, Hattori, Daniels & Adrian, LLP (57) ABSTRACT

According to an aspect of an embodiment, a memory controller for writing data into and reading data from a memory, comprises an error detector for detecting an error of data stored in the memory when reading the data, a time stamper for generating first time information indicative of the time when data is written into the memory, the first time information being written together with the data into an address location of the memory where the error has been detected, a timer for measuring a time period from the time indicated by the first time information until the time of subsequent occurrence of an error of data stored in said address location and a counter for counting a number of accesses to the address location over the time period.

18 Claims, 9 Drawing Sheets

MEMORY CONTROLLER FOR WRITING DATA INTO AND READING DATA FROM A MEMORY

BACKGROUND

The present technique relates to estimation of a cause of a defect in a memory system.

There is a system including a plurality of devices such as a central processing unit (CPU), a system controller, a memory controller, and a memory module. To configure such a system, first, a test for confirming whether each device operates normally is performed. After that, only devices that have passed the test are used to configure the system.

However, even if the system is configured by using only the devices that have passed the test, a defect may occur in the system due to an abnormality that has not been detected in the testing of each device. Here, it is difficult to specify which of the devices and the system has the cause of the defect, so that a lot of effort is needed.

Related art documents include Japanese Laid-open Patent Publication Nos. 06-124218, and 2000-11687.

SUMMARY

According to an aspect of an embodiment, a memory controller for writing data into and reading data from a memory, comprises an error detector for detecting an error of data stored in the memory when reading the data, a time stamper for generating first time information indicative of the time when data is written into the memory, the first time information being written together with the data into an address location of the memory where the error has been detected, a timer for measuring a time period from the time indicated by the first time information until the time of subsequent occurrence of an error of data stored in said address location and a counter for counting a number of accesses to the address location over the time period.

DESCRIPTION OF THE PREFERRED EMBODIMENTS

An embodiment will be described with reference to the accompanying drawings.

Figure 1:
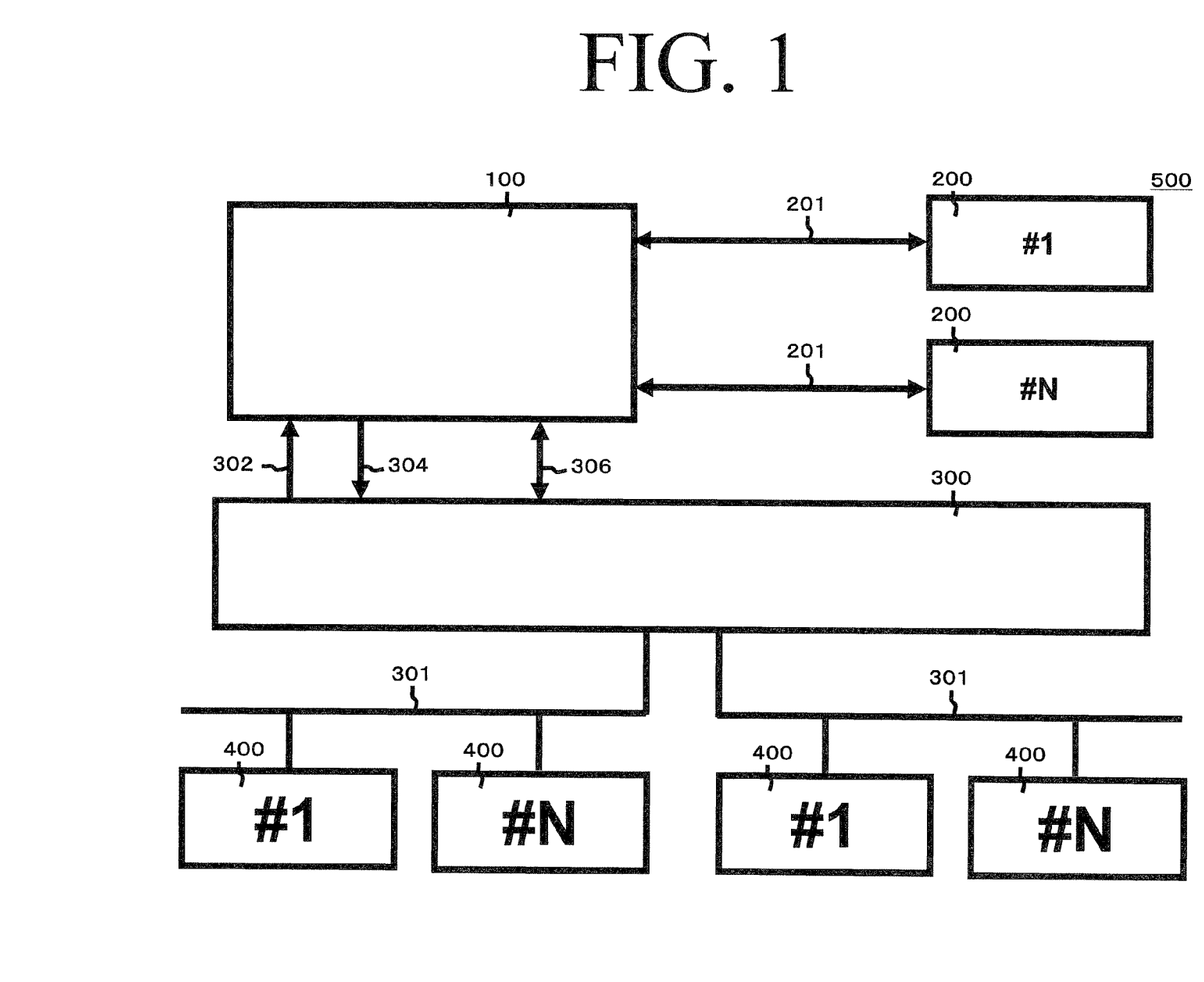
FIG. 1 is a block diagram of an overall system configuration.

FIG. 1 is a block diagram showing an overall memory system configuration. A memory system 500 includes CPUs 400, memory modules 200, a memory controller 100, and a system controller 300. The memory controller 100 is connected to one or more memory modules 200 via memory data buses 201. The system controller 300 is connected to one or more CPUs 400 via CPU data buses 301. The memory controller writes data into and reads data from the memory modules 200.

The system controller 300 controls the CPUs 400 and the memory controller 100. The system controller 300 orders the memory controller 100 to perform synchronization control and memory access. The memory controller 100 performs memory access on the basis of an order from the system controller 300.

Figure 2:
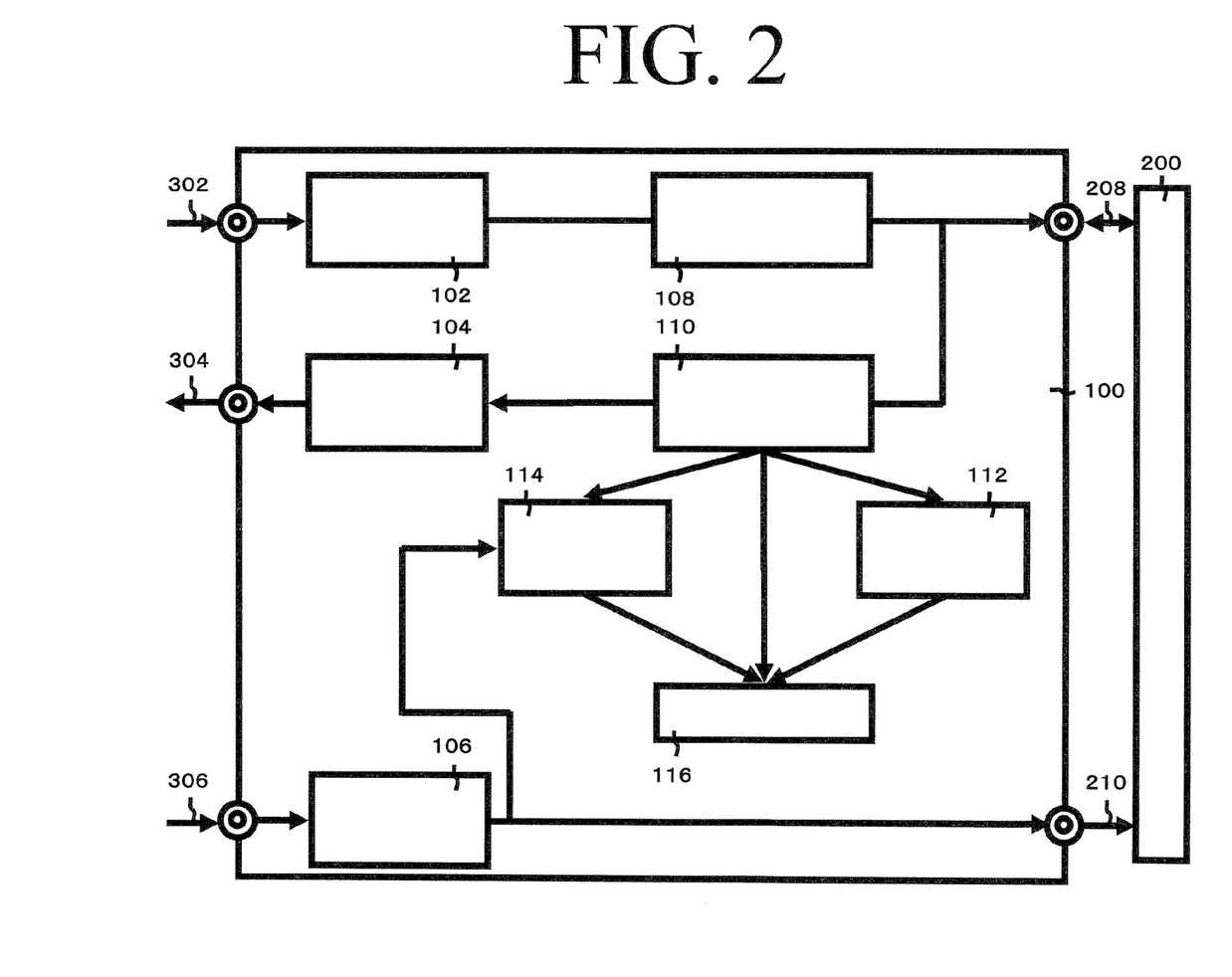
FIG. 2 is an illustration showing an example of an embodiment.
Figure 3:
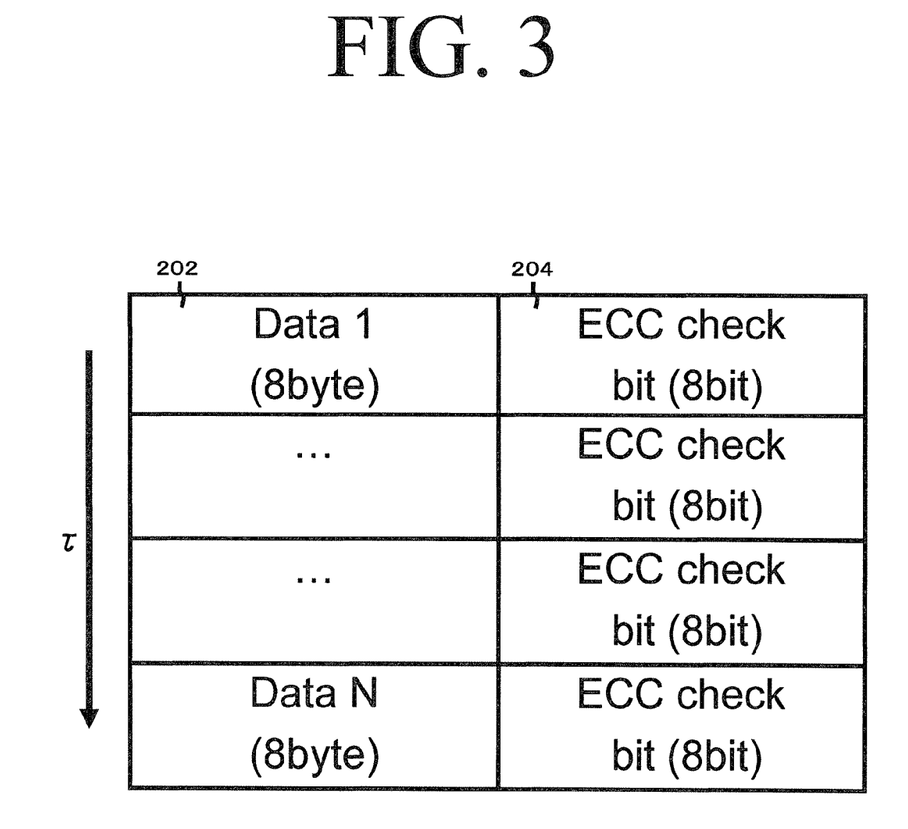
FIG. 3 is a first diagram showing a data format of a data unit that is transmitted/received in a memory access operation at one time.

FIG. 2 shows an example of the embodiment. In the overall system configuration shown in FIG. 1, in particular, the memory controller 100 and one memory module 200 are shown. When the memory controller 100 performs data writing to the memory module 200, the memory controller 100 receives, from the system controller 300, in a write data queue 102, data to be written. The memory controller 100 executes writing to the memory module 200. FIG. 3 shows a data format of the data that is transmitted to the memory module 200 when the memory controller 100 executes writing once. As shown in FIG. 3, the data has, for example, n (n>1)×8 bytes. For example, an 8-bit error correcting code (ECC) is added to each 8-byte data. The memory controller 100 transmits, to the memory module 200, the 8-byte data and the error correcting codes added thereto n times (n>1). In this manner, the memory controller 100 writes the data in the memory module 200.

When the memory controller 100 performs data reading from the memory module 200, the memory controller 100 executes reading a necessary number of times from the memory module 200. A data format of the data that is received from the memory module 200 when the memory controller 100 executes reading once is similar to a data format of the data when writing is executed, and is as shown in FIG. 3.

After reading data from the memory module 200, the memory controller 100 performs error detection and correction on the basis of the read data and error correcting codes added thereto. After performing data-error detection and correction on the basis of the error detection and correction codes, the memory controller 100 receives the read data in a read data queue 104, and transmits the read data to the system controller 300. The error detection and correction automatically corrects 1-bit errors, thus enabling continuous system operation. In addition, regarding 2-bit errors, it is ensured that the problem is detected, and the system can be safely stopped. The memory controller 100 stores, in an error register 116, error information detected by performing the error detection and correction. The error register 116 is a register from which reading can be performed by firmware with a dedicated path. The error information is read, if necessary.

Figure 4:
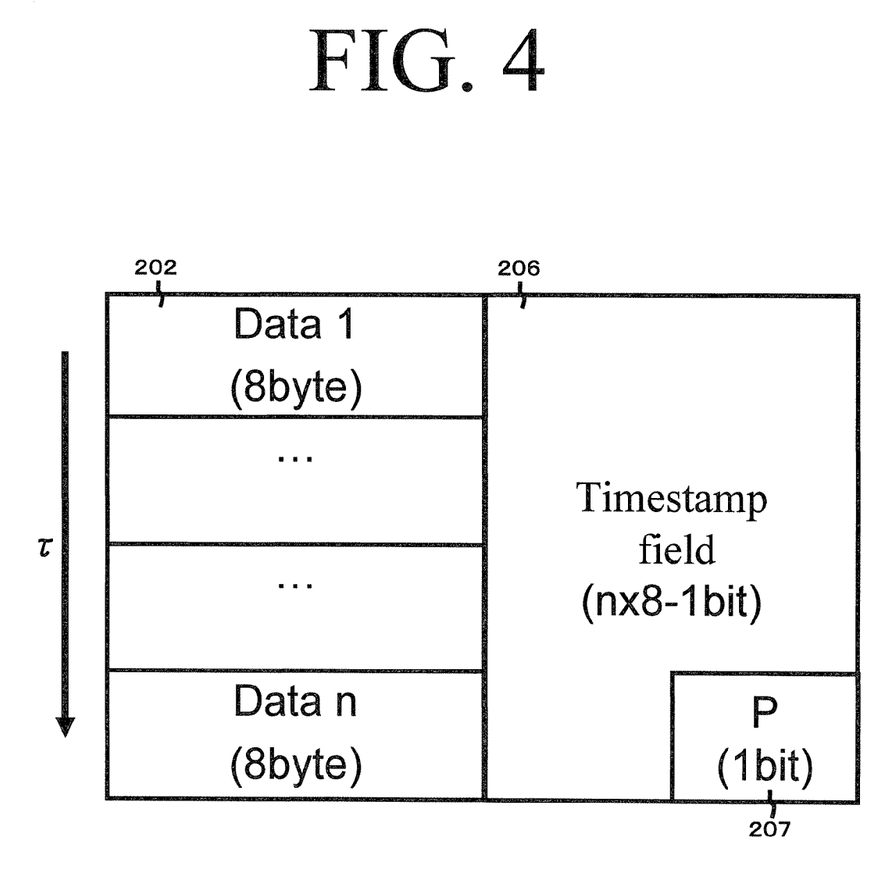
FIG. 4 is a second diagram showing a data format of a data unit that is transmitted/received in a memory access operation at one time.

A time stamp writing unit 108 replaces an error correcting code of write data with a parity bit. In addition, the memory controller 100 includes means for generating a time stamp on the basis of time information acquired from a system clock (not shown) for driving the memory system. A time stamp represents, in general, a technology for objectively certifying when data was created and that the data has not been modified to date. As a write data format shown in FIG. 4, the time stamp writing unit 108 replaces the error correcting codes with a write-time time stamp and a parity bit for detecting a data read error. As shown in FIG. 4, data for n error correcting codes added to data 1 to data n, that is, data of n×8 (bits), is replaced with a time stamp and a parity bit. Here, one bit is used for adding a parity bit, and the remaining (n×8−1) bits are used for adding a time stamp. This does not increase the amount of data if a time stamp and a parity bit are added to the data.

A data check unit 110 performs error detection and correction on the read data. Also, for data to which a time stamp is added, the data check unit 110 performs parity checking. In addition, the data check unit 110 restores data to which a time stamp and a parity bit are added to data to which error correcting codes are added as shown in FIG. 3.

A time stamp reading unit 112 acquires a data-write-time time stamp from the read data to which a time stamp is added. In addition, the time stamp reading unit 112 acquires a data-read-time time stamp.

An error address count unit 114 stores a memory access address (error occurrence address) of data in which a read error is detected by the data check unit 110 during a normal operation. The error address count unit 114 includes a counter for counting the number of times data reading has been performed for the error occurrence address. The counter increases the number of times data reading has been performed whenever data reading is performed for the error occurrence address. When data writing is performed for the error occurrence address, the counter clears the increased number of times.

In a case in which, during the normal operation, when a read error is detected at a data reading time, the error address count unit 114 stores an address at which the error has occurred. After the occurrence of the error, the time stamp writing unit 108 adds a time stamp to data and writes the data to which the time stamp is added in the memory module 200. After the data to which the time stamp is added is written, at a data reading time for an error occurrence address, the data check unit 110 performs data checking based on parity checking.

In a case in which parity checking detects a read error on data stored at the error occurrence address of the memory module 200, various types of information, such as an error occurrence address, the number of times data has been read, a time stamp at the time of writing the data, and a time stamp at a read error detecting time, is stored in an error register 116. At the time the read error on the data to which the time stamp is added is detected, the system is stopped since data correction is impossible. Accordingly, by using a dedicated reading path, information of various types is read from the error register 116 by firmware.

Figure 5:
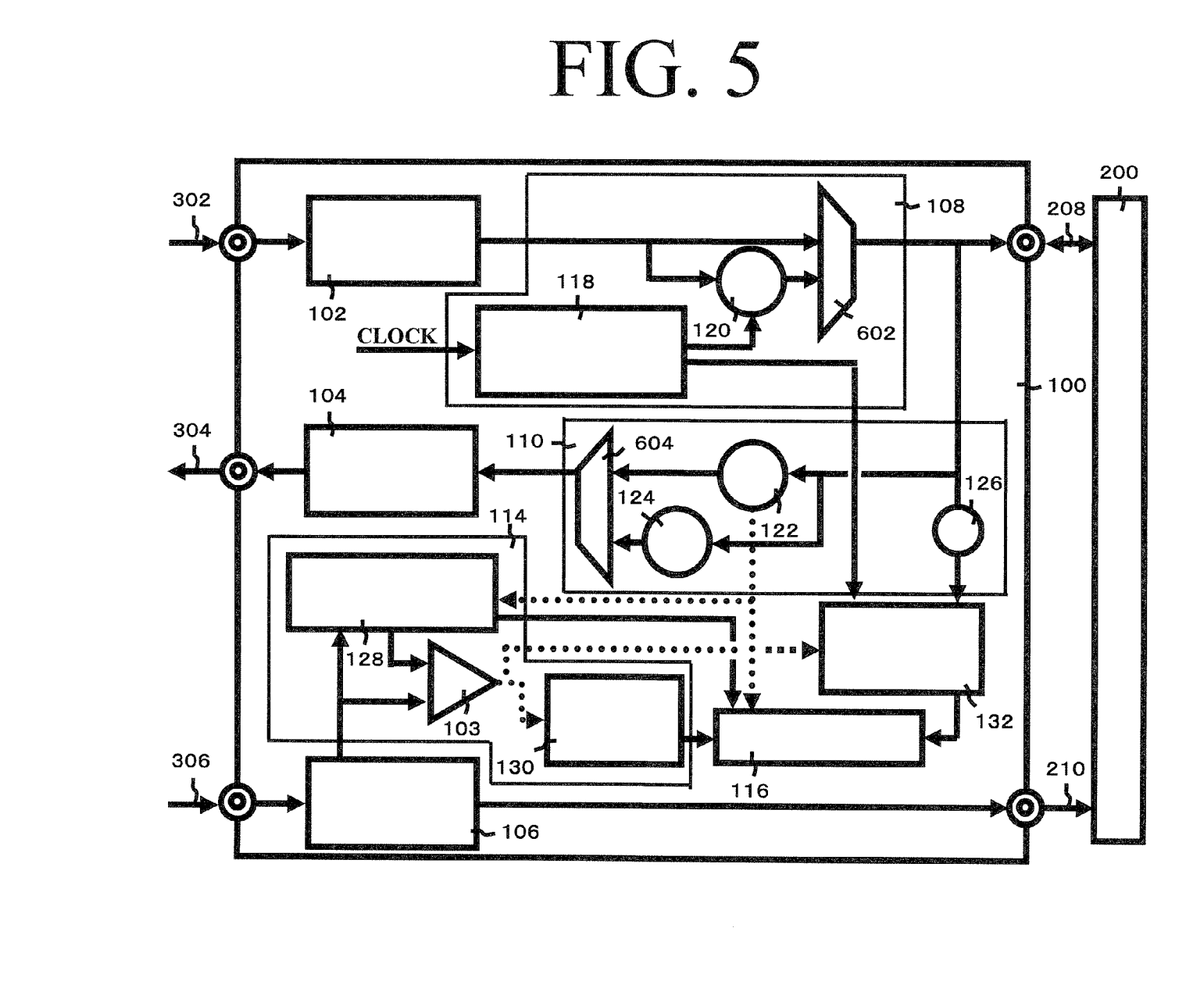
FIG. 5 is a block diagram showing an example of a memory controller according to the embodiment.

FIG. 5 shows an example of the memory controller 100 in the embodiment. In FIG. 5, each solid line indicates the flow of data or an address. Each dotted line indicates the flow of a control signal.

The time stamp writing unit 108 described with reference to FIG. 2 includes a time stamp generating circuit 118, a parity generator (PG) 120, and a selector 602.

The write data queue 102 receives write data from the system controller 300 through a write data bus 302. In order to maintain the order of write data, the write data queue 102 needs to transmit the write data in the order that the write data is transmitted from the system controller 300. Accordingly, the write data queue 102 controls the received data in a first-in first-out (FIFO) manner. Specifically, the write data queue 102 determines whether or not the memory module 200 can accept the write data. If the write data can be accepted, the write data queue 102 transmits the write data to the PG 120 or the selector 602 in order to write the write data in the memory module 200.

The PG 120 receives the write data from the write data queue 102. The PG 120 replaces an error correcting code added to the write data with a parity bit. As shown in FIG. 4, when the total number of "ones" of data having n×8 bytes, that is, data having n×64 bits, is even, "one" data is added as a parity bit. When the total number of "ones" of the data is odd, "zero" data is added as a parity bit. Since the total number of "ones" changes when a 1-bit error occurs, an error can be detected.

The time stamp generating circuit (e.g. a time stamper) 118 receives a clock signal from the system clock for driving the system. By counting number of the clock signal whenever a predetermined number of system clock cycles passes, the time stamp generating circuit 118 generates a time stamp that is information representing an elapsed time from system start-up. The number of system clock cycles to be counted can be set to any value. A time stamp unit (time scale) can be optionally set. The time stamp generating circuit 118 transmits the generated time stamp to the PG 120 in order to add the generated time stamp to the write data. The time stamper generates first time information indicative of the time when data is written into the memory. The first time information is written together with the data into an address location of the memory where the error has been detected.

The PG 120 receives the time stamp from the time stamp generating circuit 118. The PG 120 adds the time stamp to the write data. The PG 120 also adds the generated parity bit to the write data. A data format of the data to be written is shown in FIG. 4. As described above, the PG 120 replaces the error correcting codes added to the write data with a time stamp 206 and a parity bit 207. A time stamp written in the time stamp field in FIG. 4 is, for example, a count-up value obtained by the time stamp generating circuit 118 on the basis of the system clock.

The selector 602 selects between transmission of data transmitted from the write data queue 102 to the memory module 200, and transmission of data transmitted from the PG 120 to the memory module 200. The selector 602 can select which data is to be transmitted to the memory module 200 in such a manner that a comparator 103 determines whether or not the error occurrence address stored in an error address register 128 matches an address received by an address queue 106 through an address bus 306. If the error occurrence address does not match the address received by the address queue 106, the selector 602 switches a transmission path, whereby the write data queue 102 can transmit the write data to the selector 602. If the error occurrence address matches the address received by the address queue 106, the selector 602 switches the transmission path, whereby the write data queue 102 can transmit the write data to the PG 120. The comparator 103 is described later.

The data check unit 110 described with reference to FIG. 2 includes a parity checker (PC) 126, an ECC checker (ECCCHK) 122, an ECC generator (ECCGEN) 124, and a selector 604. The PC 126 performs read-data parity checking in a state in which a parity bit is added to read data. The ECCCHK 122 performs read-data error detection and correction in a state in which an error correcting code is added to read data. The ECCGEN 124 generates an error correcting code in a state in which a parity bit is added to read data.

The PC 126 receives read data from the memory module 200 through a memory data bus 208. The PC 126 performs parity checking at the time the read data has been received. In the parity checking, it is determined which of even and odd numbers the total number of "ones" in the read data is. On the basis of the result of determination and a parity bit, an error in the read data is detected. If the total number of "ones" in the read data is even, the parity bit is "one". If the total number of "ones" in the read data is odd, the parity bit is "zero". The PC 126 can detect an error in the read data on the basis of the parity bit and an even or odd total number of "ones" in the read data. The PC 126 transmits the read data and the parity checking result to a time stamp analyzing circuit 132.

The ECCCHK (e.g. an error detector) 122 receives read data from the memory module 200 through the memory data bus 208. The ECCCHK 122 performs error detection and correction on the received read data. In this embodiment, an error correcting code is added to 8-byte data. The error correcting code uses 8 bits to define an 8-byte data sequence. On the basis of the read data received from the memory module 200 through the data memory bus 208, the ECCCHK 122 generates an error correcting code at the time the read data has been received. Next, the generated error correcting code and the error correcting code added to the read data are compared. When the result of comparison indicates that the values of the error correcting codes are equal, it can be determined that the data has no error. Conversely, when the result of comparison indicates that the values of the error correcting codes differ, it can be determined that an error occurs in the data. In a case in which the result of the error detection and correction indicates that no read error has been detected, the ECCCHK 122 transmits the read data to the selector 604. Conversely, in a case in which a read error has been detected, the ECCCHK 122 performs data correction by calculating correct data from the error correcting code. In order for the error address register 128 to store an address of the memory module 200 at which the read data is stored, the ECCCHK 122 transmits a control signal to the error address register 128. On receiving the control signal, the error address register 128 acquires, from an address queue, the address of the memory module 200 at which the read data is stored. The error address register 128 is described later. The error detector detects an error of data stored in the memory when reading the data.

The ECCGEN 124 receives read data from the memory module 200 through the data memory bus 208. The ECCGEN 124 generates an error correcting code from the read data. The ECCGEN 124 replaces a time stamp and parity bit added to the read data with an error correcting code. The ECCGEN 124 transmits the read data to which the error correcting code is added to the selector 604.

The selector 604 selects between transmission of the data transmitted from the ECCCHK 122 to the read data queue 104 and transmission of the data transmitted from the ECCGEN 124 to the read data queue 104. The selector 604 can select which data is to be transmitted to the read data queue 104 in such a manner that the comparator 103 determines whether or not the error occurrence address stored in the error address register 128 matches the address received by the address queue 106 through the address bus 306. If the error occurrence address does not match the address received by the address queue 106, the selector 604 switches a read-data transmission path to the ECCCHK 122. This allows the read data queue 104 to receive the read data transmitted from the ECCCHK 122. Thus, when an error correcting code is added to read data, the ECCCHK 122 can transmit error-detected-and-corrected read data to the read data queue 104. Conversely, if the error occurrence address matches the address received by the address queue 106, the selector 604 switches a read-data transmission path to the ECCGEN 124. This allows the read data queue 104 to receive the read data transmitted from the ECCGEN 124. Thus, when a parity check bit is added to read data, the ECCGEN 124 can transmit error-correction-code-added read data to the read data queue 104. The comparator 103 is described later.

In order to maintain the order of read data, the read data queue 104 needs to transmit the read data to the system controller 300 in an order in which the read data has been transmitted from the ECCCHK 122 or the ECCGEN 124. Accordingly, the read data queue 104 controls the received read data in a FIFO manner. Specifically, the read data queue 104 determines whether or not the system controller 300 can accept the read data. If the system controller 300 can accept the read data, the read data queue 104 transmits the read data to the system controller 300 through a read data bus 304.

The error address count unit 114 described with reference to FIG. 2 includes an error address register 128, a read counter 130, and a comparator 103.

The address queue 106 receives an address from the system controller 300 through the address bus 306. The address queue 106 transmits the received address to the memory module 200 through a memory address bus 210. In addition, the address queue 106 transmits the address transmitted from the address bus 306 to the comparator 103 and the error address register 128.

When receiving the control signal from the ECCCHK 122, the error address register 128 acquires, from the address queue 106, an address of the memory module 200 at which read data for which a read error has occurred is stored. In order for the comparator 103 to determine whether or not the error occurrence address stored in the error address register 128 matches the address received by the address queue 106, the error address register 128 transmits the error occurrence address.

The comparator 103 receives the address transmitted from the address queue 106 and the error occurrence address transmitted from the error address register 128. The comparator 103 determines whether or not both match each other. If the address transmitted from the address queue 106 matches the error occurrence address, the comparator 103 transmits a control signal to the read counter 130 in order for the read counter 130 to count up. In addition, the comparator 103 transmits a control signal in order for the time stamp analyzing circuit 132 to acquire the time stamp added to the read data. The time stamp analyzing circuit 132 is described later.

The read counter 130 receives the control signal from the comparator 103. On receiving the control signal, the read counter 130 counts up. The read counter 130 counts the number of times data reading has been performed after new time-stamp-added data is written at the error occurrence address until the new data causes a read error. The read counter 130 counts up whenever data reading has been performed to an error occurrence address, and is cleared whenever new write data is written at the error occurrence address. In a case in which, after new time-stamp-added data is written at the error occurrence address, the data causes a read error, the read counter 130 transmits, to the error register 116, data concerning the number of times (based on count-up of the read counter 130) data reading has been performed. The read counter 130 counts a number of accesses to the address location from the time indicated by the first time information until the time of subsequent occurrence of an error of data stored in the address location.

The time stamp reading unit 112 described with reference to FIG. 2 includes the time stamp generating circuit 118 and the time stamp analyzing circuit 132.

The time stamp analyzing circuit 132 receives the read data and the result of parity checking from the PC 126. The time stamp analyzing circuit 132 receives the control signal from the comparator 103. When the time stamp analyzing circuit 132 receives the control signal from the comparator 103 and receives detection of an error in read data from the PC 126, the time stamp analyzing circuit 132 acquires a time stamp added to the read data. In a case in which the time stamp analyzing circuit 132 receives the control signal, an address of the memory module 200 at which the read data is stored matches the error occurrence address. This allows the time stamp analyzing circuit 132 to determine whether or not the PC 126 has detected an error in the read data stored at the error occurrence address. The time stamp analyzing circuit 132 acquires, from the time stamp generating circuit 118, a time stamp at the time the error in the read data has been detected. In addition, the time stamp analyzing circuit 132 transmits the time stamp acquired from the read data and the time stamp acquired from the time stamp generating circuit 118 to the error register 116. A timer measures the time period.

Here, also when an error correcting code is added to read data, the PC 126 performs error detection on the read data. In this case, a parity check bit is not added to the read data. Thus, the PC 126 detects an error in the read data, and transmits the read data and error detection to the time stamp analyzing circuit 132. However, from the fact that the error correcting code is added to the read data, it is indicated that the read data is not stored at the error occurrence address of the memory module 200. Therefore, since no control signal is received from the comparator 103, the time stamp analyzing circuit 132 can ignore error detection by the PC 126.

The error register 116 receives data, transmitted from the read counter 130, concerning the number of times data reading has been performed. The error register 116 also receives the time stamp transmitted from the time stamp analyzing circuit 132.

Figure 6:
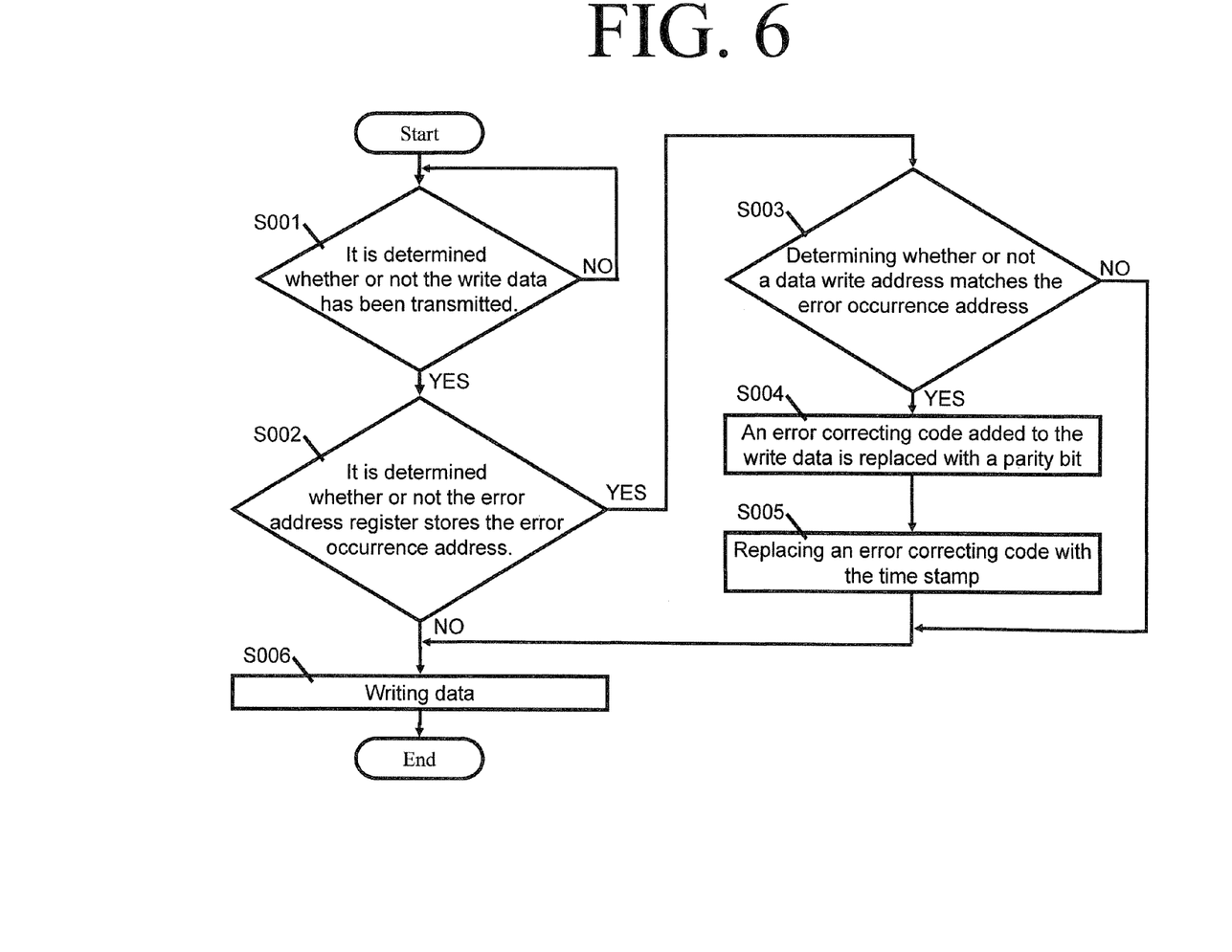
FIG. 6 is a flowchart illustrating control of a write operation to a memory in the embodiment.

A control process of a write operation to the memory module 200 is described below with reference to FIG. 6.

In step S001, it is determined whether or not the write data has been transmitted from the system controller 300 to the write data queue 102 through the write data bus 302. If the write data has been transmitted, the process proceeds to step S002.

In step S002, it is determined whether or not the error address register 128 stores the error occurrence address. If the error address register 128 stores the error occurrence address, the process proceeds to step S003. Conversely, if the error address register 128 does not store the error occurrence address, the process proceeds to step S006, and the memory controller 100 writes the write data in the memory module 200. The error occurrence address is described in detail in a control process of a read operation of the memory module 200.

In step S003, the comparator 103 determines whether or not a data write address matches the error occurrence address. Specifically, the comparator 103 determines whether or not the error occurrence address stored in the error address register 128 matches the memory address transmitted to the address queue 106 through the address bus 306. If the data write address matches the error occurrence address, the process proceeds to step S004. Conversely, if the data write address does not match the error occurrence address, the process proceeds to step S006, and the memory controller 100 writes the write data in the memory module 200.

In step S004, the PG 120 generates a parity bit on the basis of the write data. An error correcting code added to the write data is replaced with a parity bit. This allows the PC 126 (described later) to perform parity checking and to determine whether or not data written at the error occurrence address has been normally read. The process proceeds to step S005.

In step S005, the time stamp generating circuit 118 acquires a write-time time stamp generated on the basis of time information acquired from the system clock. The time stamp generating circuit 118 transmits the write-time time stamp to the PG 120. The PG 120 replaces an error correcting code with the time stamp. The process proceeds to step S006.

In step S006, the selector 602 selects the write data transmitted from the PG 120, whereby write data that is obtained by adding the parity bit generated in step S004 and the time stamp acquired from the time stamp generating circuit 118 in step S005 is transmitted to the memory module 200 through the data memory bus 208. The data, which includes the time stamp and the parity bit, is written in the memory module 200. This allows the time stamp analyzing circuit 132 to acquire a time stamp for which data is written at the error occurrence address. Furthermore, on the basis of the time stamp, an elapsed time after data is written in the memory module 200 until a read error occurs can be acquired. The process finishes.

Figure 7A:
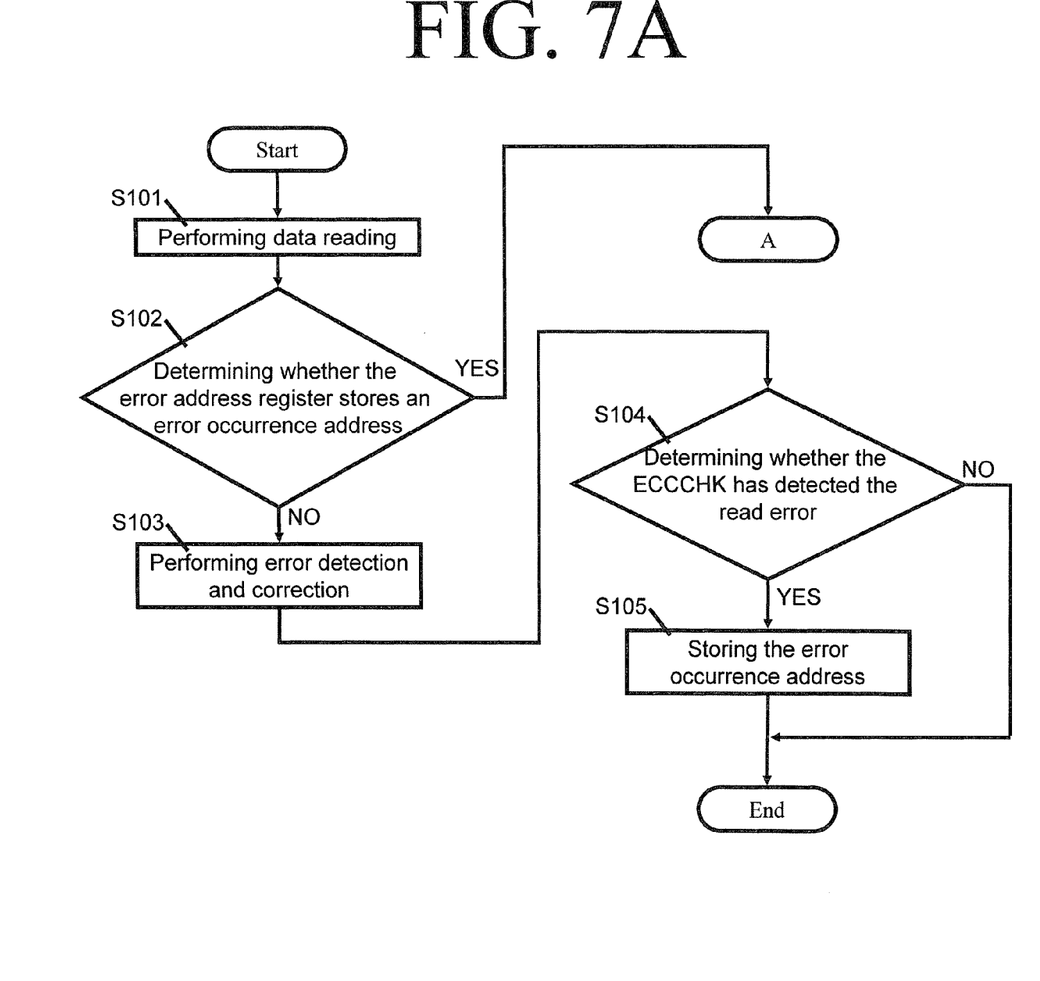
FIGS. 7A, 7B and 7C are flowcharts illustrating a read operation from the memory in the embodiment.
Figure 7B:
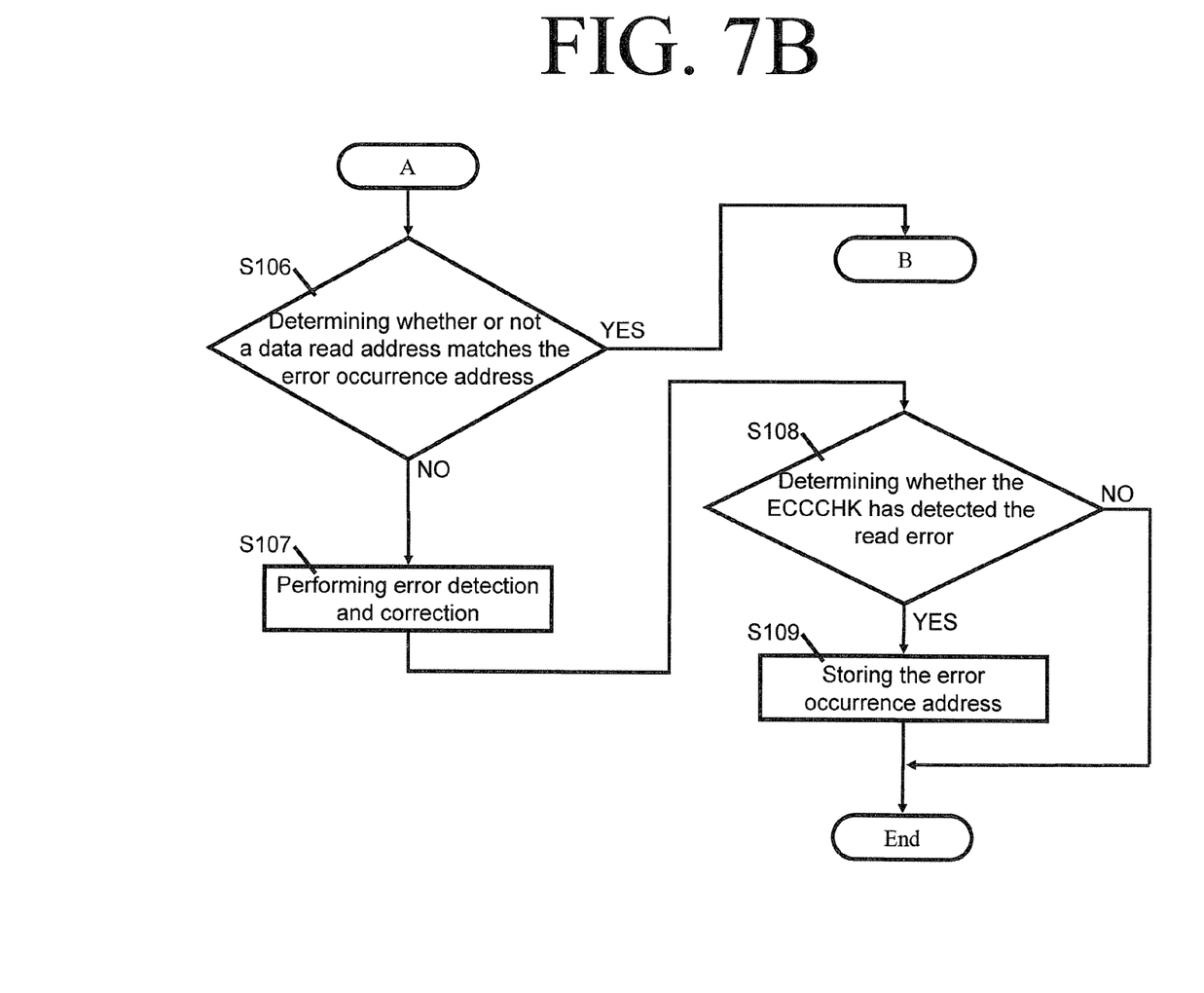
Figure 7C:
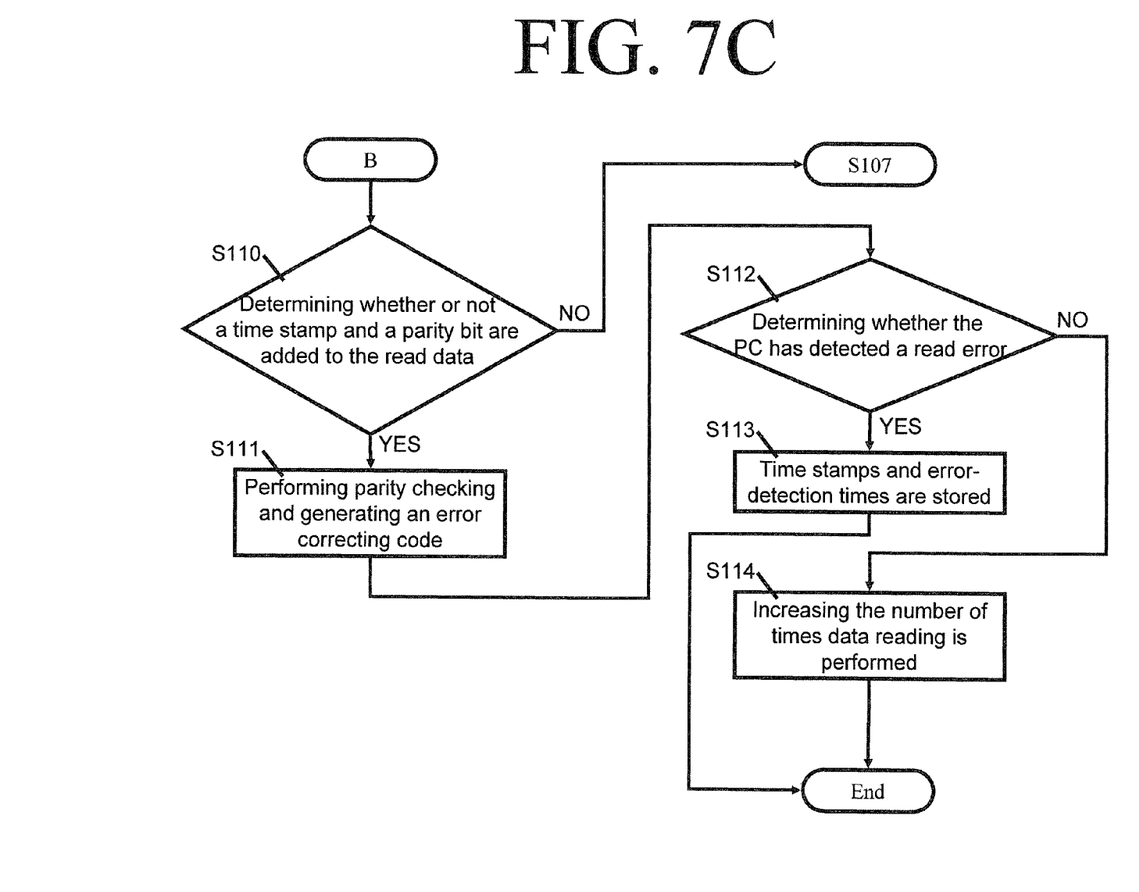

A control process of a read operation to the memory module 200 will be described with reference to FIGS. 7A, 7B and 7C.

In step S101, the memory controller 100 performs data reading. The process proceeds to step S102.

In step S102, the error address register 128 determines whether it stores an error occurrence address. If the error address register 128 stores the error occurrence address, the process proceeds to step S106. Conversely, if the error address register 128 does not store an error occurrence address, the process proceeds to step S103.

In step S103, the ECCCHK 122 performs error detection and correction on read data on the basis of an error correcting code added to the read data. The process proceeds to step S104.

In step S104, the ECCCHK 122 determines whether it has detected the read error. If the ECCCHK 122 has detected the read error, the process proceeds to step S105. If the ECCCHK 122 has not detected the read error, the process finishes.

In step S105, the ECCCHK 122 transmits a control signal to the error address register 128 in order to store the error occurrence address in the error address register 128. When receiving the control signal, the error address register 128 acquires an address from the address queue 106. This makes it possible in step S002 in FIG. 6 and step S102 in FIG. 7A to determine whether a read error has already occurred. The process finishes.

Next, a process in a case in which it is determined in step S102 that the error address register 128 stores the error occurrence address will be described.

In step S106, the comparator 103 determines whether or not a data read address matches the error occurrence address. Specifically, it is determined whether the error occurrence address stored in the error address register 128 matches the address transmitted to the address queue 106 via the address bus 306. If the data read address matches the error occurrence address, the process proceeds to step S110. Conversely, if the data read address does not match the error occurrence address, the process proceeds to step S107.

Processing from step S107 to step S109 is similar to that from step S103 to step S105. First, in step S107, the ECCCHK 122 performs error detection and correction on read data on the basis of an error correcting code added to the read data. In step S108, the ECCCHK 122 determines whether it has detected a read error. If the ECCCHK 122 has detected the read error, the process proceeds to step S109. The ECCCHK 122 transmits a control signal to the error address register 128 in order to store the error occurrence address in the error address register 128. Conversely, if the ECCCHK 122 has detected no read error from the read data, the process finishes. In a description of the embodiment, a plurality of error occurrence addresses can be stored in an error register. In order to store a plurality of error occurrence addresses, the numbers of error address registers 128, comparators 103, and read counters 130 may be increased in accordance with the number of error occurrence addresses to be stored. In addition, for example, one error address register 128, one comparator 103, and one read counter 130 may be provided.

A case in which it is determined in step S106 that the data read address matches the error occurrence address will be described.

In step S110, it is determined whether or not a time stamp and a parity bit are added to the read data. If the time stamp and the parity bit are added to the read data, the process proceeds to step S111. Conversely, if the time stamp and the parity bit are not added to the read data, the process proceeds to step S107. Here, a state in which the time stamp and the parity bit are not added to data stored at a data error occurrence address represents a state in which, although an error occurrence address is stored in the error address register 128, data to which a time stamp and a parity bit are added has not been written at the error occurrence address, and data to which an error correcting code is added is written at the error occurrence address. In this case, the ECCCHK 122 performs read error detection and read data correction on the basis of an error correcting code added to the read data. Thus, the process proceeds to step S107. Processing from step S107 to step S109 is as described above. Accordingly, a description of the processing is omitted.

In step S111, the PC 126 performs parity checking on the basis of the parity check bit added to the read data. The ECCGEN 124 generates an error correcting code on the basis of the read data, and replaces the time stamp and parity check bit added to the read data with the error correcting code. This restores the data to which the time stamp and the parity bit are added to the data to which the error correcting code is added. The process proceeds to step S112.

In step S112, on the basis of the parity checking, the PC 126 determines whether it has detected a read error. If the PC 126 has detected a read error, the process proceeds to step S113. Conversely, if the PC 126 has not detected any read error, the process proceeds to step S114. The read counter 130 increases the number of times data reading has been performed. This can acquire the number of times data reading is performed after data to which a time stamp and a parity bit are added is written at an error occurrence address until a read error occurs.

In step S113, the error occurrence address, the number of times data to which a time stamp and a parity bit are added is read, and time stamps at data-write and error-detection times are stored in the error register 116. The error occurrence address is acquired from the error address register 128. The time stamp at the data-write time is acquired from the time stamp added to the data by the time stamp analyzing circuit 132. The time stamp at the error-detection time is acquired from the time stamp generating circuit 118 by the time stamp analyzing circuit 132. The process finishes.

The error occurrence address, the number of times data reading is performed, the time stamp at the data-write time, and the time stamp at the error-detection time are read by dedicated firmware. From these pieces of information, the number of times data reading is performed (after data is written at an error occurrence address until a read error occurs) can be obtained. Further, by determining a difference between the time stamp at the data-write time and the time stamp at the error-detection time, an elapsed time after data is written at an address in which an error occurred until a read error occurs can be acquired. As described above, a time stamp is a count-up value based on the system clock. By reading the count-up value from the firmware, and converting temporal information on the basis of a time scale, the elapsed time can be acquired.

According to the embodiment, an elapsed time after data is written in a memory until a read error occurs, and the number of times the data is read can be acquired. Accordingly, the embodiment has an advantage in that information capable of being utilized for estimating a defect in the system can be provided.

Finally, effectiveness of the embodiment will be described. According to the embodiment, from an elapsed time after data is written at an address in which an error occurred until a read error occurs, and the number of times data reading is performed, a cause of the defect in the system can be estimated.

For example, it is assumed that an elapsed time until a read error occurs is shorter than a memory-module refresh cycle and the number of times data reading is performed is 100. In this case, from the number of times data reading is performed, it can be guaranteed that data has normally been written. Because, if the data has not been normally written, it is difficult to think that the data can be normally read as many as 100 times. Thus, there is a low possibility that the cause of the defect lies in a transmission path such as a memory data bus or in a memory cell of a memory module. Therefore, it can be estimated that data is lost since charge cannot be stored in a capacitor due to a long refreshing cycle. In such a case, a test may be performed, with the refresh cycle set again. If no defect occurs as the result of a test performed by setting the refresh cycle to be short, it can be concluded that the refresh cycle is not optimal.

In addition, it is assumed that an elapsed time until a read error occurs is short and the number of times data reading is performed is one. In this case, a read error occurred in the first data reading. Thus, it can be estimated that a defect occurred at the time that data was written in the memory cell of the memory module. Hence, it can be estimated that there is a high possibility that the cause of the defect lies in the transmission path such as the memory data bus or in the memory cell of the memory module. Therefore, if, for example, performing another test can prove that the transmission path, such as the memory data bus, has no defect, it can be estimated that there is a high possibility that the cause of the defect lies in the memory cell.

The foregoing embodiment is a specific description for better understanding of the embodiment, and does not limit another embodiment. Therefore, the embodiment can be modified without changing the gist thereof.

What is claimed is:

1. A memory apparatus for writing data into and reading data from a memory, comprising:
    a controller for detecting an error of data stored in the memory when reading the data, for generating first time information indicative of the time when data is written into the memory, the first time information being written together with the data into an address location of the memory where the error has been detected, for measuring a time period from the time indicated by the first time information until the time of subsequent occurrence of an error of data stored in said address location, and for counting a number of accesses to the address location over the time period; and
    a register for storing the time period and the number of accesses.

2. The memory apparatus of claim 1, wherein an error correcting code is added to the data.

3. The memory apparatus of claim 2, wherein the controller corrects the data on the basis of the error correcting code.

4. The memory apparatus of claim 3, further comprising a storage for storing an error detected address.

5. The memory apparatus of claim 2, wherein the controller replaces the error correcting code with the first time information and a parity bit for detecting an error of the data.

6. The memory apparatus of claim 5, wherein the controller detects an error of data on the basis of the parity bit.

7. A method of controlling a memory controller for writing data into and reading data from a memory, the method comprising:
- detecting an error of data stored in the memory when reading the data;
- generating first time information indicative of the time when data is written into the memory, the first time information being written together with the data into an address location of the memory where the error has been detected;
- measuring a time period from the time indicated by the first time information until the time of subsequent occurrence of an error of data stored in said address location; and
- counting a number of accesses to the address location over the time period.

8. The method of claim 7, wherein an error correcting code is added to the data.

9. The method of claim 8, further comprising error correcting for correcting the data on the basis of the error correcting code.

10. The method of claim 9, further comprising storing an error detected address.

11. The method of claim 8, wherein the generating replaces the error correcting code with the first time information and a parity bit for detecting an error of the data.

12. The method of claim 11, wherein the error detecting detects an error of data on the basis of the parity bit.

13. A memory system having a system controller for controlling the memory system, the memory system comprising:
- a memory for storing data
- a memory controller for writing data into and reading data from the memory for detecting an error of data stored in the memory when reading the data, for generating first time information indicative of the time when data is written into the memory, the first time information being written together with the data into an address location of the memory where the error has been detected, for measuring a time period from the time indicated by the first time information until the time of subsequent occurrence of an error of data stored in said address location, and for counting a number of accesses to the address location over the time period.

14. The memory system of claim 13, wherein an error correcting code is added to the data.

15. The memory system of claim 14, wherein the memory controller corrects the data on the basis of the error correcting code.

16. The memory system of claim 15, further comprising a storage for storing an error detected address.

17. The memory system of claim 14, wherein the memory controller replaces the error correcting code with the first time information and a parity bit for detecting an error of the data.

18. The memory system of claim 17, wherein the memory controller detects an error of data on the basis of the parity bit.

* * * * *